United States Patent Office 3,260,735
Patented July 12, 1966

---

3,260,735
PROCESS FOR REDUCING THE SEDIMENT IN ORGANIC POLYISOCYANATES AND PRODUCT
Eugene L. Powers, New Martinsville, W. Va., assignor to Mobay Chemical Company, Pittsburgh, Pa., a corporation of Delaware
No Drawing. Filed Nov. 2, 1962, Ser. No. 235,113
6 Claims. (Cl. 260—453)

This invention relates to organic polyisocyanates and more particularly to improved organic polyisocyanates which contain chemically combined chlorine and/or bromine, said organic polyisocyanates being liquid over a wide temperature range.

Organic polyisocyanates have achieved commercial importance for the preparation of polyurethane plastics including foams, moldings, castings, coatings, adhesives, caulks sealants putties and the like. Normally the organic polyisocyanates are purified after they have been prepared by the phosgenation of an amine, but it has been found commercially advantageous in some instances to use the organic polyisocyanates in admixture with the crude by-products of the phosgenation process. These crude by-products vary a great deal in their chemical composition and include various polymeric forms of the isocyanate which normally result from the phosgenation of a given amine. A typical crude product is that obtained by the phosgenation of the reaction product of aniline with formaldehyde in an acidic medium.

A disadvantage of the crude isocyanates is that they contain a large percentage of sediment or reaction by-products which must be carefully filtered from the reaction mixture. This is true anytime aniline or even chloroaniline is reacted with formaldehyde and then phosgenated. A more serious disadvantage, however, is that once the reaction mixture has been allowed to cool in storage or shipping, for example, to about 0° C., irreversible freezing occurs for some unexplained reason so that even on reheating, the organic polyisocyanate will not become entirely liquid and contains finely divided solids which are very difficult to filter out of the mixture. This makes it very difficult to achieve the intimate mixing necessary to prepare satisfactory polyurethane products because the solids in the crude material cause the mixing apparatus to become plugged. The worst problem occurs with spray gun type of equipment where the crude isocyanate and resin are atomized and sprayed on a wall where they react to produce a foam. The nozzles of the spray gun are easily plugged.

It is, therefore, an object of this invention to provide a method of removing a sediment from organic polyisocyanates and provide products which are substantially devoid of the foregoing disadvantages. Another object of this invention is to provide organic polyisocyanates which are liquid over a wide temperature range. A further object of the invention is to provide organic polyisocyanates which are easier to mix with organic compounds containing active hydrogen containing groups to prepare polyurethane plastics. Still a further object of this invention is to provide halogenated organic polyisocyanates which are liquid over a wider temperature range than heretofore known halogen containing organic polyisocyanates. Still a further object of this invention is to provide polyurethane plastics which have improved physical properties including, for example, dimensional stability and flame resistance. Another object of the invention is to provide an improved method of making cellular polyurethane plastics.

The foregoing objects and others which will become apparent from the following description are accomplished in accordance with the invention, generally speaking, by providing organic polyisocyanates and polyurethanes obtained therefrom, said organic polyisocyanates having been prepared by a process which includes reacting an aromatic amine with an aldehyde or ketone to prepare a mixture of aromatic polyamines linked together by the carbon group obtained from the aldehyde or ketone molecules, phosgenating the resulting amine to prepare a mixture of organic polyisocyanates and reacting the resulting mixture of organic polyisocyanates with chlorine and/or bromine whereby from about 0.5 to about 35 percent by weight of chlorine and/or bromine becomes chemically combined with the organic polyisocyanate, yielding a polyisocyanate which is liquid and substantially free of solid by-products at a temperature above about −10° C. and preferably from about −10° C. to about 50° C. Therefore, this invention contemplates halogenated organic polyisocyanates prepared by reacting an aromatic amine with an aldehyde or ketone preferably having the formula

wherein R is H, aryl, aralkyl, cycloalkyl or alkyl preferably having at most 7 carbon atoms in a first step to prepare a mixture of aromatic polyamines which are then phosgenated in a second step to prepare a mixture of aromatic polyisocyanates containing some sediment and then reacting the mixture of aromatic polyisocyanates containing sediment, thus obtained, with chlorine and/or bromine until from 0.5 to 35 percent by weight of chlorine and/or bromine becomes chemically combined with the aromatic polyisocyanate and the sediment is no longer evident. It is preferred to use aniline as the aromatic amine and it is preferred in all cases, whether or not aniline is the amine used, to have from 0.5 to 10 percent by weight of chemically combined chlorine and/or bromine in the final product. In accordance with still another preferred embodiment of the invention, the reaction of the crude mixture of aromatic polyisocyanates with chlorine and/or bromine is carried out in such a way that at least about 5 percent by weight of the total chemically combined chlorine and/or bromine is bonded to aliphatic carbon atoms.

Any suitable aromatic amine may be used such as, for example, aniline, o-, m- and p-toluidine, xylene amine, tolylene diamine, including 2,4- and 2,6-tolylene diamine, o-, m- and p-xylylene diamine and the like. It is preferred to use aniline. Any suitable aldehyde may be used such as, for example, formaldehyde, acetaldehyde, propionaldehyde, butyraldehyde, n-heptaldehyde, benzaldehyde, cyclohexane aldehyde and the like. Any suitable ketone may be use such as, for example, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. It is preferred to react formaldehyde with the aromatic amine. Any suitable method of reacting the aldehyde and/or acetone with the amine may be used, but it is preferred to carry out the reaction under acidic conditions and more preferably in the presence of HCl at a temperature of from about 90 to about 100° C. for a sufficient time to allow reaction of the amine and aldehyde or ketone to go to completion. By way of illustration, crude diphenylmethane diamine is the reaction product of aniline and formaldehyde in the presence of HCl and contains some triamines and even higher polyamines. It may be prepared by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours. In order to separate out the crude amine, the acidic reaction mixture is reacted with an equivalent amount of sodium hydroxide and crude amine is separated from the salt layer. It is preferred to distill out any unreacted aniline before phosgenating.

The amine prepared by reaction of an aldehyde or ketone with an aromatic amine may then be reacted with phosgene by any suitable process to prepare an aromatic polyisocyanate. The methods heretofore used in the prior art are satisfactory including the method disclosed in U.S. Patent 2,908,703. A satisfactory process for phosgenating the reaction mixture set forth above prepared from 60 parts of aniline and 25 parts of formaldehyde is to combine 100 parts of phosgene with the 85 parts of crude amine obtained until a product having an amine equivalent of about 135 and containing about 31 percent free —NCO is obtained by first reacting the crude amine with an excess of the phosgene at a temperature below about 60° C. until a carbamyl chloride-amine hydrochloride is obtained and then reacting the carbamyl chloride-amine hydrochloride slurry with further phosgene at a temperature close to the boiling point of the solvent or above about 80° C. until the crude aromatic polyisocyanate is obtained. This crude product will usually contain more than 0.5 percent by weight of sediment after cooling and storage.

In accordance with the present invention, this mixture of crude polyisocyanates is then further reacted with chlorine and/or bromine whereby the sediment is no longer apparent by combining the crude mixture of aromatic polyisocyanates with chlorine and/or bromine under conditions whereby the polyisocyanate is directly chlorinated or brominated. For this part of the process, it is preferred to use a catalyst including, for example, the chlorides of aluminum, copper, tin, titanium, zinc, chromium, antimony, mercury and iron. Ferric chloride is particularly effective. Another catalyst which is particularly good is elemental iodine. The bromination or chlorination may be carried out by simply combining the chlorine and/or bromine with the aromatic polyisocyanate under conditions which will produce the desired chlorination or bromination on the aromatic ring and preferably the aliphatic carbons, for example, those between the aromatic rings at least to an extent sufficient to provide at least about 5 percent by weight of the total chlorine and/or bromine on said aliphatic carbons.

The temperature at which the chlorination or bromination takes place is important, if certain processing advantages are to be obtained. If the temperature of the reaction mixture is below 50° C., an unreasonable amount of splitting at the aliphatic bridges between the aromatic rings occurs. This splitting is progressively diminished by increasing the temperature up to at least about 150° C. However, when the temperature of the reaction mixture is above about 220° C., most of the isocyanate will react with itself to form polymers which are not useful and which are moreover largely solids. It is preferred to avoid this polymerization by having the temperature below about 180° C. The best results are obtained by having the temperature in the range of about 150° C. to about 170° C. during the reaction of the chlorine and/or bromine with the mixture of isocyanates. The purpose of heating the reaction mixture is primarily to avoid the splitting out of monoisocyanates by reaction of the chlorine and/or bromine with the carbon in the aliphatic bridge but a secondary effect is to direct the chlorine to the bridge. In view of this second effect, catalysts which promote the chlorine and/or bromine addition to aromatic carbon atoms may also be used even though catalysts are not necessary. Any of the conventional catalysts may be used such as, for example, ferric chloride and iodine.

The preferred mixture of chlorinated and/or brominated aromatic polyisocyanates of the invention contains 0.5 to 10 percent by weight of chlorine and/or bromine, at least 5 per cent of which is on the methylene carbon bridge, but not more than 90 percent by weight, and are based on aniline, formaldehyde or acetone and phosgene, reacted together in such proportions that from about 50 percent to about 80 percent of aromatic diisocyanate and the balance of higher polyisocyanates are obtained. Below 0.5 percent by weight of chlorine and/or bromine does not give the desired effect of avoiding the solids. Above 10 percent, the viscosity begins to go up and above 35 percent, the viscosity is unreasonably high for good mixing on foam producing equipment. It is preferred to have less than enough chlorine or bromine present to produce an isocyanate with a viscosity below about 1000 centipoises at 25° C.

This invention also contemplates the preparation of improved polyurethane plastics from the chlorinated and/or brominated aromatic polyisocyanates prepared as set forth above. The polyurethane plastics of the invention are prepared by reacting these aromatic polyisocyanates either alone or in admixture with up to about 50 percent by weight of additional organic polyisocyanates with an organic compound containing at least two active hydrogen containing groups as determined by the Zerewitinoff method. The polyurethane plastics of the invention are useful in all of the areas where the heretofore known polyurethane plastics have been used but they are especially suitable for the preparation of rigid cellular polyurethane plastics.

Any suitable organic polyisocyanate may be used in conjunction with the chlorinated and/or brominated polyisocyanates in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3' - dichloro - 4,4' - biphenylene diisocyanate, p,p',p" - triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenyl methane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenyl methane diisocyanate.

Any suitable organic compound containing at least two active hydrogen containing groups as determined by the Zerewitinoff method, said groups being reactive with an isocyanate group, may be reacted with the chlorinated or brominated polyisocyanate in accordance with the process of the present invention to prepare polyurethane plastics. The active hydrogen atoms are usually attached to oxygen, nitrogen or sulfur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl groups and the like. Also, compounds may be used which contain one —SH group and one —OH group or two —OH groups and one —SH group as well as those which contain an amino group and a —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from 2 to 5 carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. One particularly good type of polyhydric polyalkylene ether for the preparation of rigid polyurethane foam is based on 1,1,3-tris(4-hydroxy phenyl) propane condensed with an alkylene oxide, for example, the condensate of propylene oxide with 1,1,3-(para-hydroxyl phenyl) propane having an hydroxyl number of about 220. Alpha-methyl-D-glucoside reacted with an alkylene oxide and preferably propylene oxide gives very good results also in the preparation of rigid polyurethane foams. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pages 257–262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexane triol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used as the polyfunctional active hydrogen containing reactant including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-5-amino methyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis(2-hydroxy propyl) ethylene diamine, as well as compounds of any of the classes set forth above which are substituted with halogen such as, for example, chloro, iodo, bromo and the like; nitro; alkoxy such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methyl ethyl amino and the like; mercapto, carbonyl, thiocarbonyl, phosphoryl, phosphato and the like.

The process of the invention as it relates to polyurethane plastics involves mixing the chlorinated and/or brominated aromatic polyisocyanate with the active hydrogen containing compound and allowing the reaction to proceed. It is possible to prepare a prepolymer in a first step by reacting an excess of the chlorinated and/or brominated aromatic polyisocyanate with the organic compound containing active hydrogen containing groups in a first step to prepare an isocyanato-terminated prepolymer and then reacting the prepolymer with a chain-extending agent to prepare a finished product or one may prepare the polyurethanes by combining the reaction components in essentially one mixing step. Where the prepolymers are prepared, it is preferred to use a sufficient excess of the aromatic polyisocyanates so that the —NCO to active hydrogen ratio is within the range of from about 1.5 to about 5.

A preferred process of the present invention involves the preparation of cellular polyurethane plastics. The cellular polyurethane plastics may be produced in accordance with any of the heretofore known processes for the production of cellular polyurethane plastics. Suitable processes for the preparation of cellular polyurethane plastics are disclosed in U.S. Reissure Patent 24,514 together with suitable machinery to be used in conjunction therewith. A blowing agent must be included in the reaction mixture to prepare cellular polyurethanes. Water may be used as the blowing agent or a blowing agent such as a halohydrocarbon, for example, dichlorodifluoromethane, trichlorofluoromethane, methylene chloride or the like may be included in the reaction mixture and the water may be eliminated or both may be used. Indeed there are many blowing agents which may be used even though water or the halohydrocarbons or both may be used such as, for example, pentane, hexane or similar hydrocarbon having a boiling point below about 75° C. Either the prepolymer referred to above may be reacted with water to produce a cellular polyurethane plastic or in the alternative, the chlorinated or brominated polyisocyanate may be reacted with an organic compound containing at least two active hydrogen containing groups as determined by the Zerewitinoff method, said groups being reactive with an isocyanate group, to prepare a cellular polyurethane plastic in a one-step procedure. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

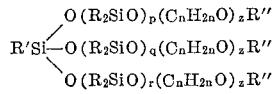

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

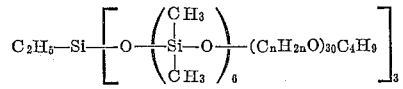

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Sutiable catalysts are, for example, tertiary amines, such as, for example, triethylene diamine, N-methyl morpholine, N-ethyl morpholine, diethyl ethanolamine, N-coco morpoholine, 1-methyl-4-dimethyl amino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are, for example, tin compounds such as stannous chloride, tin salts of carboxylic acids such as dibutyl tin di-2-ethyl hexoate, stannous oleate, dibutyl tin dilaurate, stannous octoate as well as other organo metallic compounds such as are disclosed in U.S. Patents 2,846,408, 3,047,540 and the catalyst composition as defined in claims 1 and 2 of U.S. Patent 3,044,971.

The process of the invention can be used for the preparation of castings, moldings and coating compositions including, for example, caulks, sealants, putties, adhesives, elastomers and surface coatings. Castings are prepared by mixing either an organic polyisocyanate or the above-described isocyanato-terminated prepolymer with an organic compound containing active hydrogen containing groups which are reactive with an isocyanate group preferably under substantially anhydrous conditions. Suitable procedures for this type of process are disclosed in U.S. Patent 2,729,618. Best results are obtained when an isocyanate-modified organic compound is reacted with an hydroxyl bearing organic compound having a molecular weight between about 90 and about 2000 and an hydroxyl number between about 56 and about 940. Thus, for the production of hard, rigid materials, one may use low molecular weight compounds having higher functionality based on hydroxyl groups and for flexible, elastic materials one may use high molecular weight compounds with lower functionality based on hydroxyl groups. The resulting composition may be employed as a caulk, sealant or a putty for many useful applications.

In accordance with another embodiment of the invention, moldings can be prepared by reacting the chlorinated or brominated polyisocyanate with an organic compound containing at least two active hydrogen containing groups in a kneader or other suitable mixing device to obtain a crumbly mass which is then further reacted with an organic polyisocyanate, a polyamine, a polyol, water or other suitable cross-linking agent on a rubber mill and finally pressed into a mold and allowed to cure. Suitable processes for carrying out this type of reaction may be found in U.S. Patents 2,621,166 and 2,900,368.

Coating compositions can be prepared by reacting a chlorinated or brominated polyisocyanate or isocyanato-modified prepolymer as described above with an organic compound containing at least two active hydrogen containing groups and if desired, in an inert organic solvent therefor. Any suitable inert organic solvent may be used such as, for example, xylene, ethyl acetate, toluene, ethylene glycol monoethylether acetate and the like. The resulting coating composition can be applied in any suitable fashion as by dipping, brushing, roller coating and the like, but it is preferably applied by spraying onto the substrate. Any suitable substrate may be coated with the coating composition of the invention such as, for example, wood, paper, porous plastics such as, for example, sponge rubber, cellular polyurethane plastics, foamed polystyrene and the like as well as metals such as steel, aluminum, copper and the like. The coating composition need not contain a solvent for all applications. The coating composition of the invention may contain any suitable pigment such as, for example, iron oxide, carbon black, titanium dioxide, zinc oxide, chrome green, lithol red and the like. Flexible, chemically resistant coatings are obtained in accordance with the process of the invention. The coating compositions can also be used as adhesives in accordance with the present invention by applying the coating composition to a substrate to be bonded.

The invention is applicable to the preparation of solid prepolymers having free —NCO groups suitable for further reaction and fabrication under heat and pressure as by transfer molding, injection molding, extrusion and the like. In such a process, the chlorinated and/or brominated isocyanate of the invention either alone or together with a different isocyanate is reacted with both a long chain active hydrogen containing compound and preferably one having only two active hydrogen containing groups such as a dihydroxy polyester having a melecular weight of about 600 to about 5000 and a short chain active hydrogen containing compound and preferably such a compound having only two active hydrogen containing groups such as 1,4-butane diol in such proportions that the ratio of —NCO groups to active hydrogen is within the range of about 1.02 to about 1.14. Thus, a suitable product is prepared by reacting a mixture of 1,4-butane diol (about 9 parts) and an hydroxyl terminated polyethylene adipate (about 100 parts; molecular weight about 2000) and the chlorinated reaction product containing about 2 percent by weight of chlorine with the crude product from aniline, formaldehyde and phosgene as disclosed above.

The products of the invention are useful where polyurethane plastics and organic polyisocyanates leading to the production thereof have been used heretofore. Thus, the products of the present invention are useful for the production of both sound and thermal insulation, gaskets, the potting of electrical components, bushings, the molding of the counter portion of shoes, shoe heels and the like.

The invention is further illustrated by the following examples in which the parts are by weight unless otherwise specified.

*Example 1*

About 120 mols aniline is added with cooling to maintain a temperature of about 75° C. to about 120 mols of 32 percent (aqueous) hydrogen chloride. To the resulting solution is added about 50 mols of formaldehyde (37 percent aqueous) while maintaining the temperature below about 90° C. The resulting mixture is maintained at 90° C. to 100° C. for about 3 hours. To this reaction product is charged about 122 mols of NaOH (50 percent aqueous solution). The reaction mixture separates into an oil phase and an aqueous phase. The aqueous phase is removed. The residual water and unreacted aniline is removed from the oil phase by distillation starting at about 100° C. and reducing the pressure sufficiently to remove substantially all the unreacted aniline at a still temperature below about 250° C. The resulting oil is filtered with a Buckner funnel and the crude amine thus obtained is refined by distillation under reduced pressure until the pot temperature rises to about 15° C. About 100 parts of the distillate are mixed with ortho-dichlorobenzene and the resulting solution is added to about 200 parts of phosgene dissolved in about 1100 parts of ortho-dichlorobenzene with cooling to about 75° C. A slurry is obtained which is heated to the boiling point of the mixture while an additional approximately 200 parts of phosgene are added. The resulting solution is heated to about 90° C. and about 50 mm. Hg pressure until a pot temperature of about 140° C. is obtained. The pressure is gradually reduced while maintaining about 140° C. pot temperature to about 10 mm. Hg. The final traces of solvent are then removed while maintaining the pressure at about 50 mm. Hg by raising the temperature to about 175° C. On cooling the resulting isocyanate to room temperature, a precipitate forms. About 1.5 parts elemental iodine are added and the resulting mixture heated to about 150° C. with agitation. Chlorine is bubbled through the reaction mixture until it contains about 12 percent by weight of chemically combined chlorine. The precipitate has disappeared and a liquid product is obtained.

*Example 2*

Example 1 is repeated except the crude amine is used for reaction with phosgene. A precipitate is formed in this example also and is not apparent after sufficient chlorine has been reacted with the mixture according to Example 1 to give about 3 to about 4 percent by weight of chemically combined chlorine.

*Example 3*

Two separate samples of about 100 parts each of the mixture of aromatic isocyanates containing precipitate employed in Example 2 are each mixed with about 1.5 parts of ferric chloride and then heated to about 150° C. Chlorine is thereafter bubbled through the reaction mixtures while maintaining the temperatures within the range of about 150° C. to about 180° C. for a period of about 1.5 hours, 6 hours and about 9 hours and 45 minutes, respectively until mixtures containing about 1.4 percent, 7 percent and about 14 percent by weight of chemically combined chlorine, respectively is obtained. The reaction mixture is purged with nitrogen and subjected to a partial vacuum for about 1 hour to remove excess chlorine. A third sample (control) is not chlorinated. The chlorinated samples do not contain any precipitate even after 7 days storage at −10° C. whereas solids separate out of the control sample after only 3 hours storage under the same conditions.

*Example 4*

About 100 parts of a polyhydric polyalkylene ether prepared by condensing 1,1,3-(p-hydroxyphenyl) propane with propylene oxide and having an hydroxyl number of about 220 are blended with about 1 part of a silicone oil having the formula

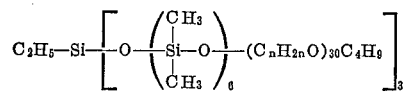

wherein $(C_nH_{2n}O)$ is a mixed polyoxyethylene and oxypropylene block copolymer containing about 17 oxyethylene units and about 13 oxypropylene units, about 40 parts of trichlorofluoromethane and about 1 part of 1-methyl-4-dimethyl amino piperazine, about 103 parts of the chlorinated isocyanate described in Example 2 are added with mixing and the material is poured into a mold where expansion takes place to form a cellular polyurethane plastic. After about 5 minutes, the foam is placed in an oven and maintained at a temperature of about 160° F. for about 16 hours to effect complete curing. A rigid, cellular polyurethane plastic is obtained which has a density of about 1.4 lbs./ft.³ and which shows markedly decreased stability characteristics.

*Example 5*

A prepolymer is prepared by mixing about 100 parts of an hydroxyl polyester having a molecular weight of about 2,000 and an hydroxyl number of about 56 and prepared by condensing adipic acid with ethylene glycol which had previously been heated to about 120° C. under a partial vacuum with about 92.6 parts of the chlorinated isocyanate of Example 2. The temperature rises as the chlorinated isocyanate is mixed with the polyester. When the temperature of the resulting prepolymer falls back to 120° C., about 10.5 parts of 1,4-butane diol are added and the resulting mixture is poured into a mold. After curing for about 16 hours at about 110° C., an elastomeric polyurethane plastic having good physical properties is obtained.

*Example 6*

A caulking compound having a pot life of about 45 minutes is prepared by combining about 70 parts of DB grade castor oil, about 30 parts of bromine castor oil, about 66 parts of red iron oxide, about 100 parts of talc, about 275 parts of berium sulphate pigment and about 400 parts of the chlorinated isocyanate prepared in Example 2.

*Example 7*

A coating composition is prepared by mixing about 348 parts of a 50:50 mixture of $CH_3COOCH_2CH_2OC_2H_5$ and xylol and about 193 parts of a polyester having an hydroxyl number of about 280 and a molecular weight of about 800 prepared from about 2.5 mols of adipic acid, about 0.5 mol of phthalic anhydride and about 4.1 moles of 1,6-hexane diol. This initial mixture is then combined with about 155 parts of the chlorinated isocyanate of Example 2 and the resulting mixture is brushed on a steel plate and put in an 80° F. oven overnight to cure. The resulting film is amber colored and free of entrained solvents found when the non-chlorinated isocyanate of Example 2 is used in the formulation.

It is to be understood that the foregoing working examples are given for the purpose of illustration and that any other suitable aromatic amine, aldehyde, ketone, catalyst, organic compound containing active hydrogen containing groups, stabilizer, filler or the like could be used therein provided that the teachings of this disclosure are followed.

The invention is particularly applicable to the preparation of polyurethane plastics which have improved flame resistance in addition to good dimensional stability. Moreover, the liquid chlorinated and/or brominated polyisocyanates of the invention are much easier to mix with the polyols leading to the production of polyurethane plastics and particularly cellular polyurethane plastics.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A method of reducing the sediment in an organic polyisocyanate which has been prepared by a process which comprises reacting an aromatic amine selected from the group consisting of aniline, ortho, meta and para-toluidine, xylene amine, tolylene diamine, and ortho, meta and para-xylene diamine, with an aldehyde or ketone having the formula

wherein R is hydrogen or a group having up to 7 carbon atoms which is aryl, aralkyl, cycloalkyl or alkyl to prepare a mixture of aromatic polyamines linked together by a group resulting from said aldehyde or ketone and phosgenating the resulting mixture of amines to prepare a corresponding mixture of organic polyisocyanates which comprises reacting said mixture of organic polyisocyanates with sufficient chlorine or bromine until about 0.5 to about 35% by weight of chlorine or bromine becomes chemically combined with said organic polyisocyanate whereby said organic polyisocyanate is free of sediment at a temperature of from about minus 10° C. to about 50° C.

2. The product of the method of claim 1.

3. The method of claim 1 wherein said aromatic amine is aniline and said aldehyde is formaldehyde.

4. The method of claim 1 wherein the reaction of said mixture of aromatic polyisocyanates with said chlorine or bromine is carried out in the presence of elemental iodine or metal chlorides of aluminum, copper, tin, titanium, zinc, chromium, antimony, mercury or iron.

5. The method of claim 1 wherein said mixture of organic polyisocyanates is reacted with sufficient chlorine or bromine so that the resulting product contains from about 1 to about 10% by weight of chemically combined chlorine or bromine.

6. The method of claim 1 wherein at least 5% of the total weight of chemically combined chlorine or bromine is bonded to aliphatic carbon atoms.

References Cited by the Examiner

UNITED STATES PATENTS

| | | | |
|---|---|---|---|
| 2,915,545 | 12/1959 | Tazuma | 260—453 |
| 2,938,054 | 5/1960 | Demers et al. | 260—453 XR |
| 2,945,875 | 7/1960 | Tazuma | 260—453 |
| 3,054,760 | 9/1962 | Worsley et al. | 260—2.5 |
| 3,055,845 | 9/1962 | Merten et al. | 260—2.5 |

CHARLES B. PARKER, *Primary Examiner.*

DONALD E. CZAJA, DALE R. MAHANAND,
*Assistant Examiners.*